G. F. FISHER.
METHOD OF COATING FABRIC WITH VULCANIZABLE PLASTIC MATERIAL.
APPLICATION FILED SEPT. 9, 1920.
1,402,288. Patented Jan. 3, 1922.
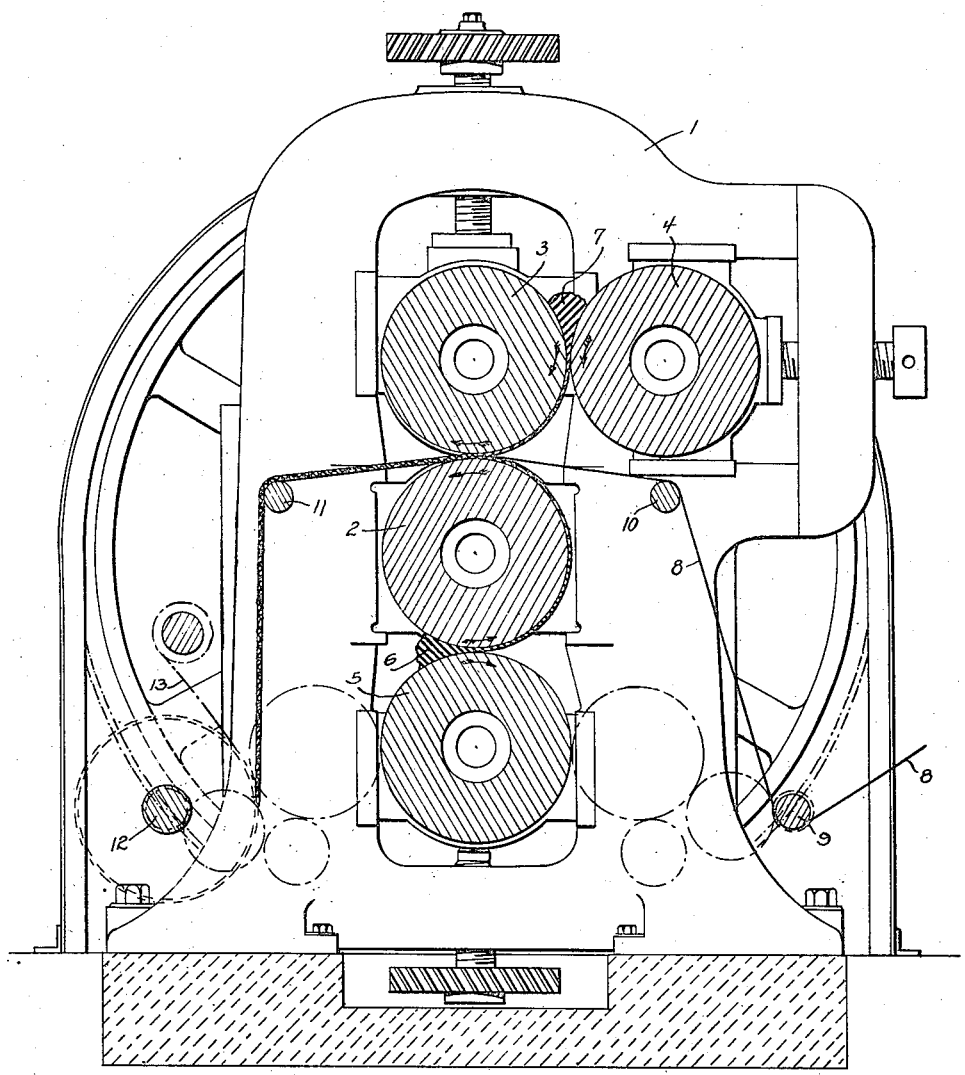
Inventor.
George F. Fisher,
By his Attorney,
Ernest Hopkinson

UNITED STATES PATENT OFFICE.

GEORGE F. FISHER, OF PROVIDENCE, RHODE ISLAND, ASSIGNOR TO REVERE RUBBER COMPANY, A CORPORATION OF RHODE ISLAND.

METHOD OF COATING FABRIC WITH VULCANIZABLE PLASTIC MATERIAL.

1,402,288.   Specification of Letters Patent.   Patented Jan. 3, 1922.

Application filed September 9, 1920. Serial No. 409,124.

*To all whom it may concern:*

Be it known that I, GEORGE F. FISHER, a citizen of the United States, residing at Providence, county of Providence, State of Rhode Island, have invented certain new and useful Improvements in the Methods of Coating Fabric with Vulcanizable Plastic Material, of which the following is a full, clear, and exact description.

This invention relates to a method of rubberizing both sides of fabric in one operation and more specifically to the application of superficial or skim coats to both sides thereof.

Heretofore fabrics have been rubberized in a variety of ways sometimes being conducted through a bath of rubber composition in a more or less liquid condition and sometimes being led through a machine for spreading the rubber in a more or less liquid condition on the fabric. But for incorporation in expensive articles like tires, whose requirements for building are quite exacting, it is common if not universal to skim coat one side by passage of the fabric successively through sets of heated calender rolls. This invention is confined to "skim" coating in its generally accepted sense where the vulcanizable rubber composition is applied to the fabric in a relatively stiff plastic condition substantially free of solvents for the rubber by passage between the rolls of a calender.

The present invention aims primarily to coat fabric on both sides with a film, skim or otherwise designatable superficial layer of vulcanizable plastic composition in one operation by a single pass between opposed heated rolls, with a view to saving machinery space, labor and time and obtaining a more uniform product.

According to the present invention the fabric is conducted between heated pressing rolls which are supplied or sheathed with a film of vulcanizable composition by feed rolls in cooperative relation therewith and so arranged as to hold a bank of vulcanizable composition between their respective bights.

The invention is illustrated in the accompanying drawings in the single figure of which apparatus for accomplishing the method of the present invention is disclosed in vertical cross-section.

In the embodiment of the invention shown which is illustrative only of the principles underlying the present invention, appears a four roll calender comprising a frame 1 with opposed pressing rolls 2 and 3 with which the latter respectively cooperate feed rolls 4 and 5. As shown the rolls 2, 3 and 5 are stacked one above another in a vertical plane and the roll 4 arranged in a horizontal plane or substantially so with the uppermost roll 3. The axis of the roll 2 is fixed but the axes of the rolls 3, 4 and 5 may be varied so as to alter the applied pressure for which purpose their shafts are mounted in suitably adjustable boxes in a well known manner and as conventionally illustrated. The rolls may be revolved in the directions indicated by the arrows by any suitable well-known means such as connected gearing. The peripheral velocity of the pressing rolls 2 and 3 is the same but the feed rolls 4 and 5 are preferably driven so that their peripheral velocity is slightly less than that of their cooperating presser rolls. The relative peripheral velocities of the feed and presser rolls varies however, with the nature of the vulcanizable composition but generally the surfaces of the pressing rolls travel four tenths faster than the feed rolls.

As is well-known when vulcanizable plastic is banked as indicated at 6 and 7 between the bights of the feed and pressing rolls a sheet or film of rubber adheres to the more rapidly moving pressing rolls and is adapted to be carried around against fabric that is passed between the rolls. It is to be understood that the several rolls may be heated in any suitable manner, and the rolls maintained at a suitable temperature which varies with the composition of the rubber employed.

The fabric indicated at 8 may be conducted from a suitable source of supply to a let-off roll indicated at 9 and thence to a carrier roll 10 which is substantially in a horizontal plane with the meeting line between the pressing rolls 2 and 3. Rearwardly of the latter is a second and similarly disposed carrier roll 11 over which the fabric is conducted as it passes from the pressing rolls and led to a wind-up reel indicated at 12, a wrapper 13 being conducted between the successive convolutions of coated fabric to prevent their adhesion.

The apparatus is simple and its operation will be obvious without further explanation.

Fabric may be coated according to the method of the present invention more efficiently than in any prior practice known to me. As the fabric passes between the heated pressing rolls it is simultaneously and at opposite points subjected to a necessarily equal pressure. By suitable control of the heating medium of the rolls the conditions of temperature at the time of the application of the plastic to the fabric may be made substantially the same on both sides of the material. The above conditions are ideal and obtain in the method of the present invention. But not only is the present method more satisfactory in the above respects, it enables the fabric to be coated on both sides with less apparatus and labor, and in one half the time heretofore required.

In the claims, the expression "relatively stiff and non-spreadable plastic" refers to a vulcanizable rubber composition, or other plastic, of a "calenderable", as distinguished from a "spreadable", consistency. For "spreading", the plastic must be relatively fluid, usually being rendered so with a proper quantity of solvent. For "calendering", the plastic must be and is of relatively stiff consistency, substantially incapable of flowing of its own weight, as it must be to some extent at least in "spreading".

The term "films" as employed in the claims is intended to refer to layers or strata of rubber of a few thousandths of an inch in thickness, some tire stocks, for instance, having films of .008 inch gauge more or less.

It is to be understood that the method of the present invention is not limited in any way to details above described which are given purely for the purpose of making the nature of the invention clear. The particular arrangement and disposition of the rolls may be varied and likewise also the auxiliaries for conducting the fabric. Therefore, reference should be made to the accompanying claims for a full understanding of the metes and bounds of the invention.

Having thus described my invention, what I claim and desire to protect by Letters Patent is:

1. A continuous method of skim-coating both sides of fabric with relatively stiff and non-spreadable plastic which consists in, continuously forming the plastic into continuous and unbroken films of the desired uniform thickness, and immediately feeding the films while free and unconfined to opposite sides of the fabric, and continuously and simultaneously pressing the films onto the fabric at directly opposite points.

2. Calendering both sides of fabric with relatively stiff and non-spreadable plastic by continuously rolling the plastic into uniform continuous and unbroken films, feeding the films while free and unconfined to opposite sides of a moving fabric, and continuously and simultaneously pressing the films onto the fabric at directly opposite points.

Signed at Providence, Rhode Island, this 1st day of Sept., 1920.

GEORGE F. FISHER.